United States Patent [19]
Kitrell

[11] Patent Number: 4,786,141
[45] Date of Patent: Nov. 22, 1988

[54] VISUAL SIGNAL DEVICE INCLUDING AN EXPANDABLE BELLOWS-LIKE ELEMENT

[76] Inventor: John V. Kitrell, 4639 Holdrege St., Lincoln, Nebr. 68503

[21] Appl. No.: 146,487

[22] Filed: Jan. 21, 1988

[51] Int. Cl.⁴ .............................................. G02B 5/12
[52] U.S. Cl. .................................. 350/99; 280/289 R
[58] Field of Search .................. 350/99, 97, 632, 638, 350/105; 116/28 R; 280/289 R

[56] References Cited

U.S. PATENT DOCUMENTS

| | | | |
|---|---|---|---|
| 4,046,397 | 9/1977 | Kitrell | 280/289 R |
| 4,113,351 | 9/1978 | Kitrell | 350/99 |
| 4,571,025 | 2/1986 | Stephen | 350/99 |

Primary Examiner—John K. Corbin
Assistant Examiner—Loha Ben
Attorney, Agent, or Firm—Zarley, McKee, Thomte Voorhees & Sease

[57] ABSTRACT

A visual signal device for mounting on the bicycle or the like comprising a housing including first and second housing members which are pivotally secured together and which may be moved from closed to open positions. When the housing members are in their closed positions, a light reflective surface and a highly visible florescent surface are viewable from the rear of the bicycle. When the housing members are in their open position, a bellows-like element is expanded rearwardly to a multi-dimensional visual signal which is visible not only from the rear but also from the sides of the bicycle.

6 Claims, 2 Drawing Sheets

VISUAL SIGNAL DEVICE INCLUDING AN EXPANDABLE BELLOWS-LIKE ELEMENT

BACKGROUND OF THE INVENTION

This invention relates to a visual signal device, more particularly to a visual signal device which may be mounted on a bicycle or on a child carrier mounted on the bicycle. Further, the visual signal device of this invention may be mounted a on trailer being pulled by the bicycle.

In the co-pending applications filed concurrently herewith, entitled "Visual Signal Device for a Bicycle" and a "Fender Mounted Visual Signal Device for a Bicycle", respectively, improved visual signal devices are described which are believed to represent an improvement over applicant's earlier U.S. Pat. Nos. 4,046,397 and 4,113,351. Although the inventions described in the co-pending applications do satisfy all of their stated objectives, the devices described in the co-pending applications are not readily visible from the side of the bicycle.

It is therefore a principal object to provide an improved visual signal device for a bicycle or the like.

A further object of the invention is to provide a visual signal device for a bicycle or the like including an expandable bellows-like element which is not only visible from the rear of the bicycle but which is also visible from the side of the bicycle.

A further object of the invention is to provide a device of the type described which is relatively small when in its closed position but which presents a large visual signal means when in its open position.

Yet another object of the invention is to provide a device of the type described which reflects light at night and which is also visible during daylight hours.

Yet another object of the invention is to provide a device of the type described which provides a large and readily visible visual signal means.

These and other objects will be apparent to those skilled in the art.

SUMMARY OF THE INVENTION

Figure 1:
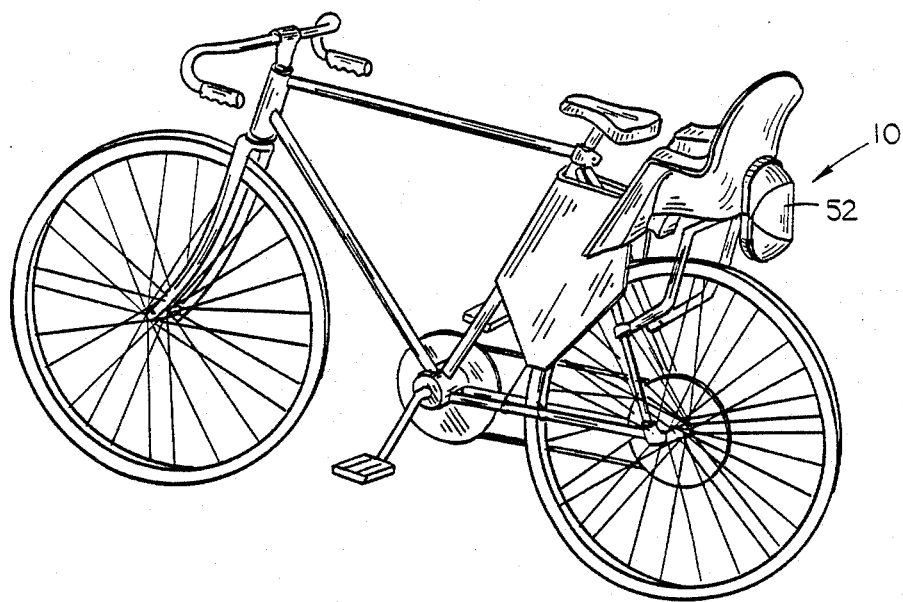
FIG. 1 is a rear perspective view of a bicycle having the device of this invention mounted thereon.

A visual signal device is described comprising a housing including first and second housing members which are pivotally secured together and which may be moved from closed to open positions. When the housing members are in the closed position, a light reflective surface and a highly visible fluorescent surface are viewable from the rear of the bicycle. When the housing members are in the open conditions, a bellows-like element is expanded rearwardly into a multidimensional visual signal means which is visible not only from the rear of the bicycle but also from the sides of the bicycle.

DESCRIPTION OF THE PREFERRED EMBODIMENT

The visual signal device of this invention is referred to generally by the reference numeral 10 and is designed to be mounted at the rear of a bicycle or at the rear of an infant carrier mounted on the bicycle as well as a trailer pulled by the bicycle. Device 10 comprises first and second housing members 12 and 14 which are pivotally secured together as will be described in more detail hereinafter. Housing member 12 is provided with a generally semi-elliptical wall 16 having a forward end 18 and a rearward end 20. Housing member 12 is provided with a substantially horizontally disposed lower end portion 22 and an arcuate upper end portion 24. Lip or flange 26 extends rearwardly from the periphery of wall 16 to define a compartment 28 therein. Wall 16 is provided with a forwardly extending bolt 30 for mounting the device on a suitable supporting surface such as a bicycle, carrier, trailer, etc.

Figure 2:
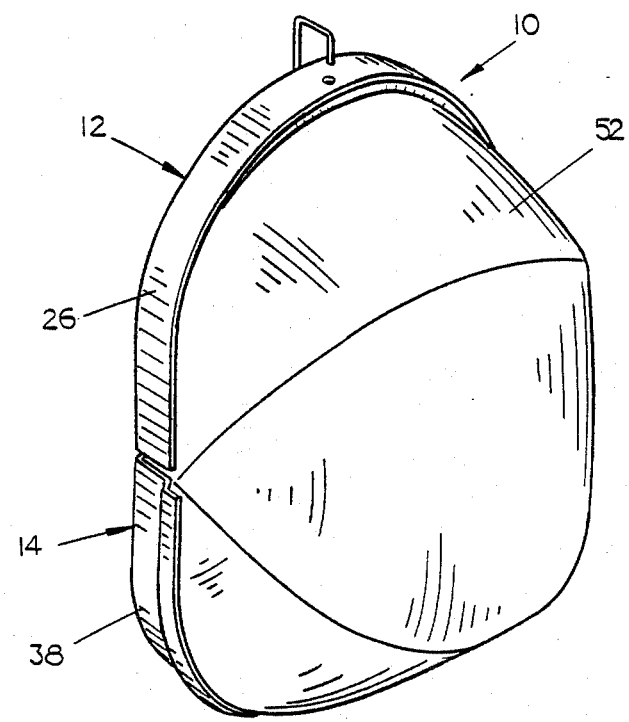
FIG. 2 is a rear perspective view of the device in its operative or open position.
Figure 3:
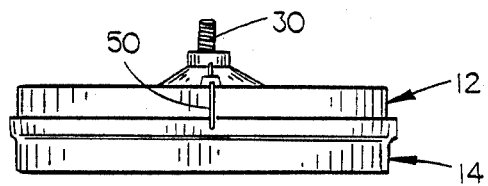
FIG. 3 is a top view of the device in its closed position.
Figure 4:
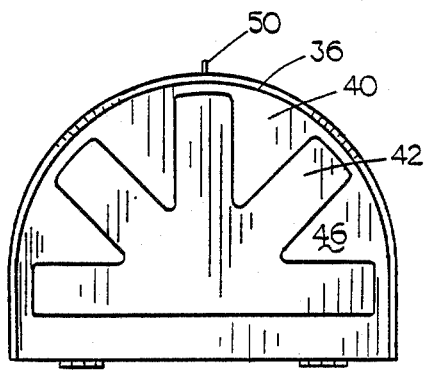
FIG. 4 is a rear view of the device in its closed position.
Figure 5:
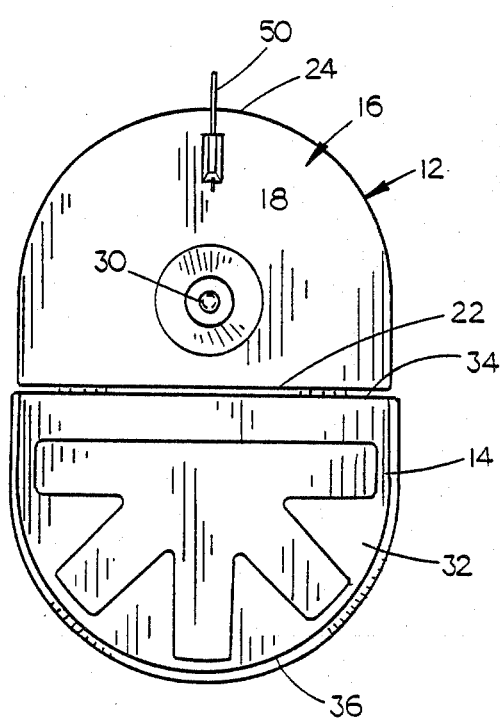
FIG. 5 is a front view of device in its open position.

Housing member 14 includes a semi-elliptical wall 32, substantially horizontally disposed end portion 34, and arcuate end portion 36. Housing member 14 includes a flange or lip 38 which extends therefrom as seen in the drawings. When the housing member 14 is in the closed position as illustrated in FIGS. 3 and 4, the rearward side 40 of wall 32 will be visible from the rear of the bicycle. Rearward side 40 of housing member 14 includes a fan-shaped light reflective member 42 provided thereon with the remainder of the rearward end of the housing member 14 being painted or coated with a highly visible fluorescent or day glow orange material referred to generally by the reference numeral 46. When housing member 14 is in its closed position, flange 38 embraces flange 26 with the flange 36 and wall 40 defining a compartment 48 therein. Housing members 12 and 14 are pivotally secured together by any convenient fashion so that the housing member 14 may be pivotally moved from the closed position of FIG. 4 to the open position of FIG. 2. The numeral 50 refers generally to a selective operable closure means which may be employed to maintain housing member 14 in its closed position.

Figure 6:
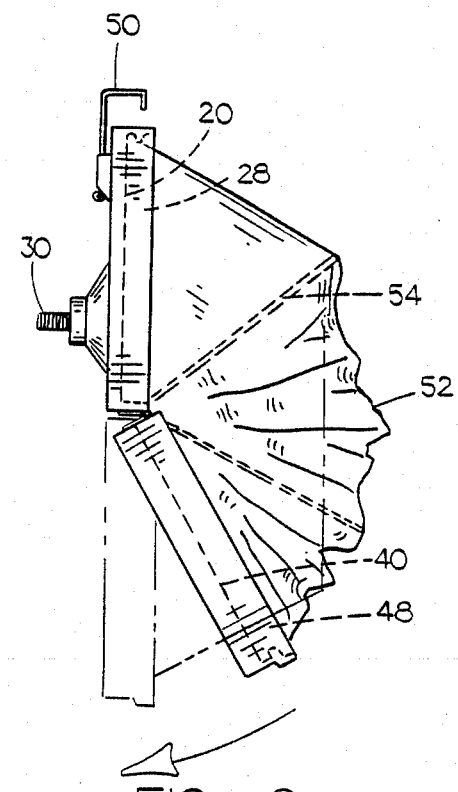
FIG. 6 is a side elevational view of the device with the broken lines illustrating the movement of the device.

The numeral 52 refers to a flexible bellows-like element or member having its periphery secured to housing members 12 and 14 which is normally positioned in a compressed position in compartments 28 and 48 when housing members 14 is in its closed position. Bellows-like member 52 is preferably constructed of a flexible fabric or plastic material having a highly visible fluorescent or day glow orange material on its exterior surface. A plurality of bows or hoops 54 are positioned within bellows-like member 52 in the housing members 12 and 14 and are adapted to cause the bellows-like member 52 to be expanded to the position seen in FIGS. 2 and 6 when housing member 14 is opened. When viewed from the rear, bellows-like member 52 presents a generally elliptical-shaped visual signal area which is readily visible. The fact that the member 52 expands rearwardly from the housing members 12 and 14 causes a multidimensional member to be provided which results in the member 52 also being visible from either side of the bicycle.

Thus, during the day, housing member 14 would normally be in its opened position so that the large member 52 is visible from the rear and the sides of the bicycle. However, if it is not desired to open housing member 14 during the day, the fluorescent surface 46 at the rear of housing member 14 will also provide a visual signal means.

Thus, it can be seen that the device of this invention accomplishes at least all of its stated objectives.

I claim:

1. A visual signal device comprising, a first generally semi-elliptical housing member, said first housing member dwelling in substantially a vertical plane and having a substantially horizontal lower end portion, an arcuate upper end portion, and rearward and forward ends, a second generally semi-elliptical housing member pivotally secured to said first housing member and being movable from a first closed position to a second open position with respect to said first housing member, said second housing member being positioned closely adjacent the rearward end of said first housing member and having a substantially horizontal lower end portion, an arcuate upper end portion, and rearward and forward ends, when in said closed position, means pivotally securing the lower end portions of said housing members together whereby said second housing member will be positioned directly below said first housing member when in said open position, means for selectively maintaining said second housing member in said closed and open positions, said second housing member having a visual signal material on its rearward end, a flexible bellows-like member, having a visual signal material thereon, secured to said first and second housing members and being positioned therebetween when said second housing member is in its closed position, means for expanding said bellows-like member rearwardly into a multidimensional visual signal means when said second housing member is moved to its open position, means for maintaining said bellows-like member in its expanded position, and means for mounting said first housing member on a supporting member.

2. The device of claim 1 wherein said bellows-like member is highly visible.

3. The device of claim 1 wherein said bellows-like member is comprised of a fluorescent colored fabric material.

4. The device of claim 1 wherein the rearward end of said second housing member has a visual signal means positioned thereon which is visible when said second housing member is in its closed position.

5. The device of claim 4 wherein the visual signal means on the rearward end of said second housing member comprises both light reflective means and a fluorescent colored means thereon.

6. The device of claim 1 wherein said means for maintaining said bellows-like member in its expanded position comprises a plurality of spaced-apart hoop members.

* * * * *